219-121 SR

7/28/87 OR 4,683,367

United States Patent [19]

Drouet

[11] Patent Number: 4,683,367

[45] Date of Patent: Jul. 28, 1987

[54] METHOD AND DEVICE FOR CONTROLLING THE EROSION OF THE ELECTRODES OF A PLASMA TORCH

[75] Inventor: Michel G. Drouet, St-Bruno, Canada

[73] Assignee: Hydro-Quebec, Quebec, Canada

[21] Appl. No.: 854,677

[22] Filed: Apr. 18, 1986

Related U.S. Application Data

[63] Continuation of Ser. No. 751,573, Jul. 3, 1985, abandoned.

[30] Foreign Application Priority Data

Jun. 7, 1985 [CA] Canada .................................. 483451

[51] Int. Cl.[4] .......................... B23K 15/00; B23K 9/00

[52] U.S. Cl. ....................... 219/121 PY; 219/121 PR; 219/123; 219/121 PT; 315/111.41; 313/231.51

[58] Field of Search ....... 219/121 PY, 121 P, 121 PT, 219/121 PV, 121 PU, 74, 75, 123; 313/231.31, 231.41, 231.51; 315/111.21, 111.41

[56] References Cited

U.S. PATENT DOCUMENTS

| | | | |
|---|---|---|---|
| 3,283,205 | 11/1966 | De Bolt | 219/123 |
| 3,654,513 | 4/1972 | Hammer | 219/123 |
| 4,194,106 | 3/1980 | Rudaz et al. | 219/123 |
| 4,219,726 | 8/1980 | Meyer et al. | 219/123 |
| 4,242,562 | 12/1980 | Karinsky et al. | 219/123 |
| 4,278,868 | 7/1981 | Rudd et al. | 219/123 |
| 4,439,657 | 3/1984 | Shimanovich et al. | 219/123 |

*Primary Examiner*—M. H. Paschall
*Attorney, Agent, or Firm*—Oblon, Fisher, Spivak, McClelland & Maier

[57] ABSTRACT

Method and device for controlling the erosion of the electrodes of a plasma torch, in which an electrical arc is produced when the electrodes are connected to an electrical supply. An axial magnetic field generated by a system of field coil causes the rotation of the extremities of the arc according to a circular trajectory inside the electrodes. The relative position of the field coils is such that there exists a position on the electrode surface where the value of the total magnetic field is a minimum where the arc runs thereby controlling the erosion of the electrodes. According to the invention, the value of current is periodically varied in the system of field coil used to cause the rotation of the arc, thereby producing a controlled axial displacement of the circular trajectory of the extremity of the arc. The plasma torch according to the invention is characterized by structure to periodically vary the value of the current in the field coil system used to cause the rotation of the arc thereby producing a controlled axial displacement of the circular trajectory of the extremity of the arc. Under these conditions, the life of the electrodes is substantially increased.

8 Claims, 7 Drawing Figures

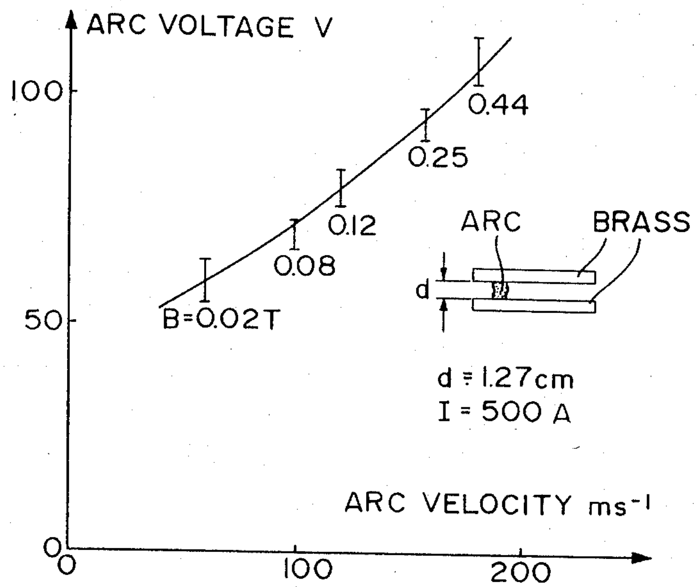
FIG. 2
FIG. 4
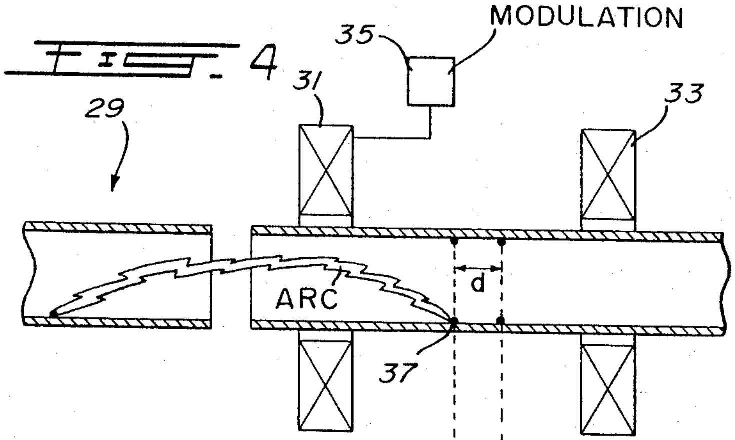
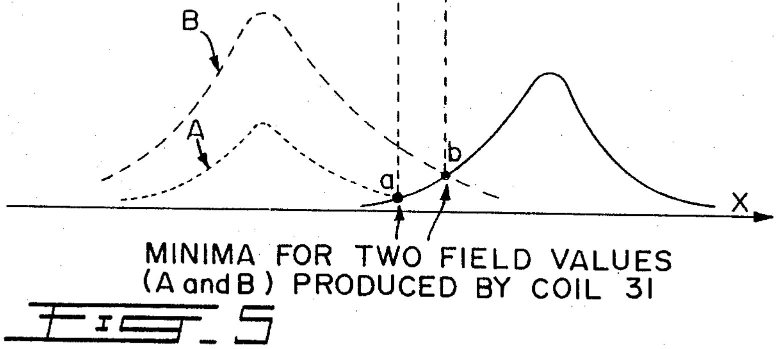
FIG. 5

METHOD AND DEVICE FOR CONTROLLING THE EROSION OF THE ELECTRODES OF A PLASMA TORCH

This application is a Continuation of application Ser. No. 751,573, filed July 3, 1985 now abandoned.

BACKGROUND OF INVENTION (a) Field of the Invention

The present invention concerns a method and a device for controlling the erosion of the electrodes of a plasma torch. More specifically, the invention is concerned with the use of the plasma torch under conditions where the electrodes of the torch have a substantially extended life by increasing the surface swept by the extremity of the arc.

More particularly, the invention relates to the controlled displacement of the foot of the arc on the electrode surface of a plasma torch. The controlled displacement of the foot of the arc is obtained by using a time varying magnetic field configuration.

(b) Description of Prior Art

The driving action of a magnetic field on an electrical arc is well known in the art: the value of the driving force on the arc depends on the values of both the arc current J and the magnetic force B according to the following equation:

$$\text{Force} = J \times B.$$

Furthermore, the direction of the force is perpendicular to both the directions of the current and of the magnetic field.

It is known that the iron and steel industry requests a large amount of energy, the latter being mainly produced by fuels, and that it uses little electricity. For example, in so called integrated plants, coal is preferably used to supply the larger part of the energy required (chemical and thermal) for the reduction of the iron mineral into a metallic state. Coal is also used as a source of energy to manufacture steel by directly converting the metal in an open hearth or in basic oxygen furnaces and coke combustion oven gas, as well as in the other stages of treatment (gas coke oven and gas blast furnace). On the other hand it is known that the non integrated planes must use other forms of energy for melting and heating.

For all kinds of reasons, it would be of interest to convert as many plants as possible to electricity, if this operation would be profitable. However, at the present rates for electricity, especially if conventional equipment is used, it has not been found practical to carry out the conversion. However, the plasma torch could be interesting and practical, especially for the production of a current of hot air or reducing gas for blast furnaces, reforming of fossil fuel for direct reduction, the replacement of electrodes in arc furnaces, scrap preheating, inert gas melting, pellet firing, ingot heating and ladle preheating.

The use of electrical arcs to give very high temperature gases dates from the start of the present century and the apparatus that is used to produce these temperatures is commonly known as plasma torch. These devices have rapidly gone from simple curiosities which are used in laboratories to specialized equipment for the manufacture of unique objects. Recently, the increasing prices and uncertainties with respect to the availability of light hydrocarbon fuels have led the experts to consider the application of plasma torches to a larger number of industrial processes operating at high temperatures. Two main reasons are at the base of this proposition. First, this device enables to reach much higher temperatures, to give much higher heating efficiency than what can be obtained by simple combustion. Secondly, it has been discovered that in many cases, the yields obtained are higher than when operating in conventional manner.

It is known on the other hand that the plasma torches include electrodes which must eventually be replaced because of the erosion produced at the extremity of the arc. Now, if this resplacement takes place at too close intervals, the use of the plasma torch is not profitable, as it is more often the case.

Several patents relate to magnetic fields interacting with electric arcs; U.S. Pat. No. 3,283,205 describes, for example, an arc plasma device where a high frequency magnetic field is used to force the arc column to oscillate laterally with respect to a stream of fluid thus increasing the energy transfer between the arc and the fluid.

Numerous patents relate to the use of a magnetic field to cause an arc to move continuously either on the end of two coaxial annular electrodes or inside two coaxial cylindrical electrodes.

In some applications, as for example in U.S. Pat. Nos. 3,654,513 and 4,439,657, the amplitude of the magnetic field is constant. As the magnetic coils are usually in close proximity of the arc plasma, intensive cooling of the coils must be provided as related in U.S. Pat. No. 4,242,562.

In other applications the amplitude of the magnetic field is varied in time. This is the case of U.S. Pat. No. 4,278,868 where the magnetic field, causing the arc to traverse the metal surfaces to be heated, can be modified in strength or distribution to vary the traverse rate. In still another case (U.S. Pat. No. 4,194,106) the magnetic field is varied to obtain arc-pulsation effects useful for cutting eroding, welding and depositing materials by means of electric arc devices.

BRIEF DESCRIPTION OF DRAWINGS

The invention will now be described hereinafter with reference to the annexed drawings, which are given only by way of illustration and without intending to limit the scope of the invention. In the drawings:

FIG. 2 is a curve of the arc voltage with respect to the arc velocity at constant current;

FIG. 4 is a schematical representation of a plasma torch according to the invention; and FIG. 5 is a curve illustrating the axial distribution of the field produced and the position of the minima for two values of the field produced by one of the coils of the torch illustrated in FIG. 1.

Figure 1:
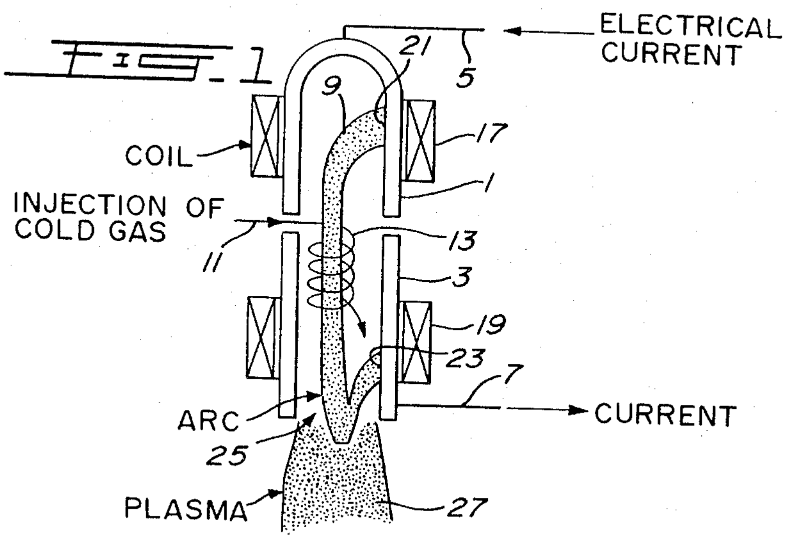
FIG. 1 is a schematical illustration of the principle of a known plasma torch.

More specifically, the plasma torch is used to convert the electrical energy of a gas into thermal energy by passing the gas in contact with an electrical arc maintained between two electrodes. A typical torch is illustrated in FIG. 1 and comprises:

(a) two cylindrical electrodes 1,3 connected to an electrical supply 5,7 and between which there is an electrical arc 9, (b) a tangential injection 11 of cool gases creating a vortex 13 and assuring a maximum transfer of energy between the arc 9 and the gas 11, (c) coils 17, 19 producing an axial magnetic field to cause the rotation of the feet of the arc 21,23 thereby spreading the inevitable erosion of the electrodes, and (d) an outlet 25 of hot gas or plasma 27.

The temperature of this gas varies with the electrical output of the electrical arc and the gaseous flow; since this temperature can reach 3000° to 10,000°, the hot produced is highly ionized, and is consequently a plasam from which the name given to this apparatus, a plasma torch.

The electrical power of the commercial available torches vary between a few kW and ten MW or so.

For industrial operations, the life of the electrodes is of primary importance. The manufacturers of plasma torches mention life expectancies between 100 and 1000 hours for cooled electrodes.

The rate of erosion of the electrodes depends of the conditions of operation: value of the arc current, materials and temperature of the electrode, nature and pressure of ambient gas, movement of the extremity of the arc. However, the wear phenomenon is not well understood at all.

The tangential injection of the cold gases and the presence of an actual magnetic field are each responsible for the production of a rotation of the extremity of the arc at the surface of tubular electrodes. The arc is carried by the rotating gases or is pushed by the force $I \times B$ resulting from the interaction between the magnetic field B and the current of the arc I. So, the speed of the arc increases with the value of the magnetic field transversely applied to the arc.

Figure 3A:
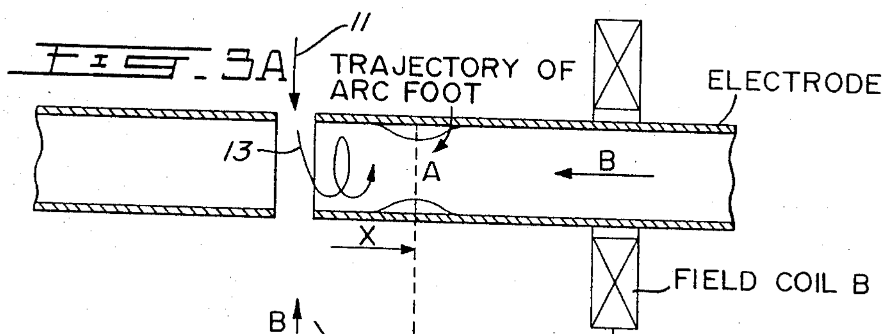
FIG. 3*a* is a schematical illustration of the arc foot trajectory in a configuration electrodes-field coil.
Figure 3B:
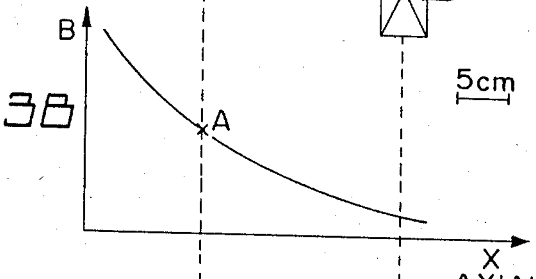
FIG. 3*b* is a curve illustrating the position of the trace of the arc foot trajectory with respect to the applied magnetic field.
Figure 3C:
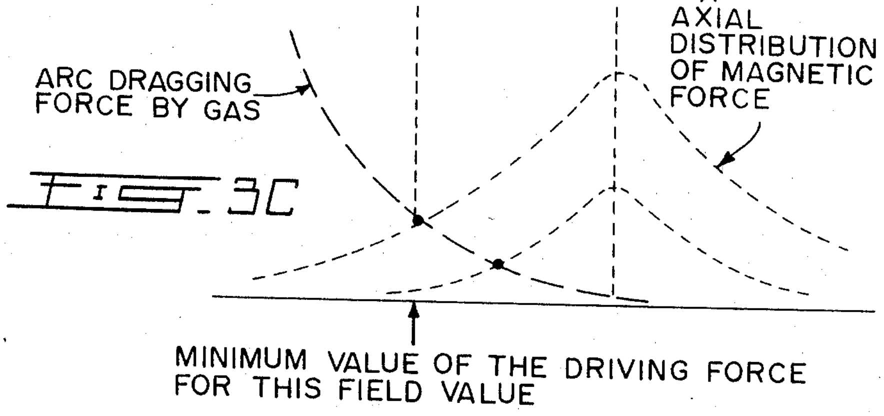
FIG. 3*c* is a curve representing the plot of the values of the driving forces with respect to the position of the arc foot along the axis of the electrodes.

On the other hand, since the arc voltage increases with its speed of displacement, the arc will always have a tendency to burn in the region where its speed is minimum as shown in FIG. 2 where B is the value of the driving magnetic field, d is the arc length, $V_1$ is the voltage of the arc produced and I is the intensity of the arc current. This means that the arc will stay in the region where the sum of the hydrodynamic and magnetic driving forces is minimal. This phenomenon is very well illustrated by the results obtained in a plasma torch (output$\approx$1 MW) as shown in FIGS. 3*a*, 3*b* and 3*c* where A and B are as defined above and x represents the position of the trace of the arc on the electrode surface: the trace A is circular and its distance with respect to the space between the electrodes where the gas is injected increases when the magnetic field B is reduced.

On the whole, according to the technique which is presently used to increase the life of the electrodes, the arc is usually rapidly displaced along a circle at the surface of the electrode by a constant magnetic field, thereby spreading on the internal surface of the cylindrical electrode where the arc is attached, the inevitable erosion which is obtained when the arc is in contact with the surface of the electrode. This improvement substantially increases the life of the electrode which is subject to erosion, since the foot of the arc does not remain fixed in a single point but, on the contrary, the extremity of the arc sweeps a circular surface. It remains however that the electrode is damaged to that extent that after a certain period of time, it must be changed. There is therefore a definite need to be able to rely on a technique which still increases the life of the plasma torches, at least if the field of application of these devices is to be extended.

A plasma torch is described in U.S. Pat. No. 4,219,726. This torch is characterized by a pair of axially spaced cylindrical electrodes forming a narrow gap therebetween and connected to a first alternating current power source to produce an arc in the gap, each electrode having magnetic coils means for producing an axial magnetic field to rotate the arc at the electrode surface, each coil being connected to a second alternating current power source. The disadvantage of this torch construction lies in that the position of the arc foot on the electrode surface is not controlled; the absence of control on the arc foot position characterizes also the operation of all the arc devices discussed previously here or elsewhere.

On the contrary, the object of the present invention is to provide a positive control of the arc foot position on the electrode surface. As the arc foot trajectory on the surface is controlled, it is possible to distribute the inevitable erosion over a much larger area and this way to greatly increase the lifetime of the electrodes.

An object of the present invention concerns a method which enables to cause a controlled axial displacement of the circular trajectory of the extremity of the arc.

SUMMARY OF THE INVENTION

The invention concerns a method for controlling the erosion of the electrodes of a plasma torch, in which an electrical arc is obtained when the electrodes are connected to an electrical supply and an actual magnetic field produced by a system of field coil, causes the rotation of the extremities of the arc along a circular trajectory inside the electrodes. According to the invention, position of the field coils is such as to produce a minimum in the value of the total magnetic field somewhere on the electrode surface. As discussed earlier, it is well known that both the arc velocity and the arc voltage increase with the magnetic field and consequently an arc will preferably burn in the regions where the magnetic field is minimum. For example, in experiments conducted here it was found that an arc, driven by a transverse magnetic field between two wide rail electrodes, chooses to run in the region where the field was a minimum and indeed such region was produced, on purpose, in order to guide the arc along a chosen trajectory.

The object of the invention is to utilise this property of arcs to run in region of minimum magnetic field in order to force the arc along a given trajectory on the surface thus increasing the area over which the electrode erosion will occur and in this way increasing the lifetime of the electrode. The magnetic field configuration, produced by the system of field coils used in the present invention, is such as to effectively trap the arc foot in its magnetic field minimum. Such a configuration is illustrated in FIG. 5.

Furthermore, according to the invention, the value of the current in the system of field coil used to cause the rotation of the arc is varied periodically to produce a controlled axial displacement of the circular trajectory of the extremity of the arc.

Preferably, the value of the current in the coil device is continuously modulated so as to introduce a displacement of each extremity of the arc along a cylindrical surface, for example according to a helicoidal trajectory.

According to a preferred embodiment of the invention, the field coil device includes two or more field coils for each electrode.

The value of the current(s) in one or more of the coils can be continuously modulated so as to actually modify the position of the minimum of the resultant of the fields thereby producing an axial displacement of the radial trajectory of the extremity of the arc. Preferably, the modulation of the value of the currents is adjusted so as to synchronize the axial displacements of the extremities of the arc of the two electrodes to preserve a constant length of the arc and thereby maintaining the voltage of the arc at the same value.

DESCRIPTION OF PREFERRED EMBODIMENTS

With reference to FIG. 4, it will be seen that the torch 29 comprises at least two field coils 31 and 33 for each electrode, contrary to the commercial torches which comprise only one field coil. The value of the current in one of the coils (or in both of them) is continuously modulated by any known means so as to axially modify the position of the minimum of the sum of the two fields thereby causing an axial displacement d of the radial trajectory a or b of the extremity of the arc 37. Consequently, the extremity of the arc does not follow a circle since it moves on a cylindrical surface. The axial displacements of the extremities of the arc at the two electrodes can be synchronized by any known means to maintain a constant length of the arc and thereby preserving the voltage of the art to the same value.

An axial displacement of the trajectory of the extremity of the arc can also be obtained in the case where each electrode of the plasma torch comprises only one single coil and one vortex injection of the gas; this displacement can be obtained by continuously modulating the current in the coil. This control is however less efficient than by using two or more coils.

The rate of erosion of a commercial torch has been measured by many manufacturers, and it has been found to be about $1.5\times10^{-9}$ kg per coulomb of electricity. The quantity of eroded material after 400 hours of operation at 1000A of a torch is therefore of:

$$1.5\times10^{-9}\times400\times3600\times1000=2.16\text{ kg}$$

For a torch in which the electrode has an interior diameter of 7 cm and a useful thickness of 1 cm with respect to erosion, the erodes length X in the axial direction is (density for copper 8.95):

$$X=\frac{2.16}{8.95}\ \frac{1}{0.7\times\ \times0.1}=1.1\text{ dm }11\text{ cm}$$

If the entire surface of the electrode whose length is higher than 50 cm is used, there is an increase of the life of the electrode by a factor of 4.5 (i.e. 2000 hours).

I claim:

1. Method for controlling the erosion of the electrodes of a plasma torch, in which an electric arc is produced when the electrodes are connected to an electrical supply, gases are introduced in said electrodes tangentially relative to said arc, an axial magnetic field generated by a system of field coils causing the rotation of the extremities of the arc along a circular trajectory inside the electrodes, which comprises providing at least two field coils for each electrode, continuously modulating the value of the current in at least one of the coils so as to axially modify the position of the minimum of the sum of the two fields produced by the two coils, positioning said field coils so as to produce said minimum on the surface of the electrode, allowing the extremity of said arc to run along the surface of the electrode where the value of the magnetic field presents said minimum, thereby causing a unidirectional displacement of the circular trajectory of the extremity of the arc.

2. A method according to claim 1, which comprises continuously modulating the value of the current in the coils, so as to move the extremities of the arc on a cylindrical surface.

3. A method according to claim 2, which comprises displacing the extremities of the arc along a helicoidal trajectory.

4. Method according to claim 3, which comprises modulating the value of the currents so as to synchronize the actual displacements of the extremities of the arc at the two electrodes to maintain a constant length of the arc and keeping the voltage of the arc at the same value.

5. A plasma torch comprising two cylindrical electrodes enabling to obtain an electrical arc when said electrodes are connected to an electrical supply, means for introducing gases in said electrodes tangentially relative to said arc, a system of at least two field coils for each electrode to cause a rotation of the extremities of the arc according to a circular trajectory inside the cylindrical electrodes, means for continuously modulating the value of the current in at least one of the coils so as to axially modify the position of the minimum of the sum of the two fields produced by the two coils, means for positioning said field coils so as to produce said minimum on the surface of the electrode, means for allowing the extremity of said arc to run along the surface of the electrode where the value of the magnetic field presents said minimum, thereby producing a unidirectional displacement of the circular trajectory of the extremity of the arc.

6. A plasma torch according to claim 5, wherein said modulating means continuously modulate the value of the current in the coil system, so as to displace each of the extremities of the arc on the internal surface of the electrodes.

7. A plasma torch according to claim 6, which comprises means operative to cause the displacement on the cylindrical surface to be carried out according to a helicoidal trajectory.

8. A plasma torch according to claim 5, wherein means are provided to adjust the modulation of the value of the current so as to synchronize the axial displacements of the extremities of the arc to the two electrodes so as to keep the length of the arc constant and maintaining the voltage of the arc at the same value.

* * * * *